(12) United States Patent
Stepin et al.

(10) Patent No.: US 11,228,788 B2
(45) Date of Patent: Jan. 18, 2022

(54) IN-LOOP FILTER APPARATUS AND METHOD FOR VIDEO CODING

(71) Applicant: HUAWEI TECHNOLOGIES CO., LTD., Shenzhen (CN)

(72) Inventors: Victor Alexeevich Stepin, Moscow (RU); Roman Igorevich Chernyak, Moscow (RU); Sergey Yurievich Ikonin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/931,341

(22) Filed: May 13, 2020

(65) Prior Publication Data

US 2020/0275131 A1    Aug. 27, 2020

Related U.S. Application Data

(63) Continuation of application No. PCT/RU2017/000849, filed on Nov. 13, 2017.

(51) Int. Cl.
*H04N 19/00* (2014.01)
*H04N 19/82* (2014.01)
(Continued)

(52) U.S. Cl.
CPC .......... *H04N 19/82* (2014.11); *H04N 19/117* (2014.11); *H04N 19/124* (2014.11);
(Continued)

(58) Field of Classification Search
CPC ...... H04N 19/82; H04N 19/86; H04N 19/176; H04N 19/51; H04N 19/124; H04N 19/182; H04N 19/117; H04N 19/147
See application file for complete search history.

(56) References Cited

U.S. PATENT DOCUMENTS

2010/0098345 A1*  4/2010  Andersson .......... H04N 19/61
                                                    382/238
2011/0249725 A1  10/2011  Auyeung et al.
(Continued)

FOREIGN PATENT DOCUMENTS

CN        102263940 A    11/2011
CN        103222263 A     7/2013
(Continued)

OTHER PUBLICATIONS

Lim et al., "1D-DCT based frequency domain adaptive loop filter (FD-ALF)," Joint Collaborative Team on Video Coding (JCT-VC) of ITU-T SG16 WP3 and ISO/IEC JTC1/SC29/WG11, 7th Meeting: Geneva, CH, JCTVC-G666, XP030110650, pp. 1-12 (Nov. 21-30, 2011).

(Continued)

*Primary Examiner* — Zhihan Zhou
(74) *Attorney, Agent, or Firm* — Leydig, Voit & Mayer, Ltd.

(57) ABSTRACT

The disclosure relates to an in-loop filter apparatus for video coding, which is configured for processing a reconstructed frame corresponding to a current frame for generation of a filtered reconstructed frame, wherein the reconstructed frame comprises a plurality of pixels, each pixel being associated with a pixel value. The in-loop filter apparatus comprises a processing unit configured to: partition the reconstructed frame into a plurality of overlapping and/or non-overlapping 2D pixel blocks; generate for each 2D pixel block a 2D spectrum by applying a 2D transform to the 2D pixel block, wherein the 2D spectrum comprises a plurality of spectral components; generate for each 2D pixel block a filtered 2D spectrum by multiplying each spectral component with a respective gain coefficient, wherein the respective gain coefficient depends on the respective spectral component and/or one or more neighboring spectral com- (Continued)

ponents of the respective spectral component and one or more filtering parameters; generate for each 2D pixel block a filtered 2D pixel block by applying an inverse 2D transform to the filtered 2D spectrum; and generate the filtered reconstructed frame on the basis of the plurality of filtered 2D pixel blocks.

20 Claims, 9 Drawing Sheets

(51) Int. Cl.
    *H04N 19/117*     (2014.01)
    *H04N 19/124*     (2014.01)
    *H04N 19/147*     (2014.01)
    *H04N 19/176*     (2014.01)
    *H04N 19/182*     (2014.01)
    *H04N 19/51*     (2014.01)

(52) U.S. Cl.
    CPC ......... *H04N 19/147* (2014.11); *H04N 19/176* (2014.11); *H04N 19/182* (2014.11); *H04N 19/51* (2014.11)

(56) References Cited

U.S. PATENT DOCUMENTS

| | | | |
|---|---|---|---|
| 2011/0274158 A1* | 11/2011 | Fu | H04N 19/129 375/240.02 |
| 2012/0177104 A1* | 7/2012 | Budagavi | H04N 19/176 375/240.02 |
| 2012/0288213 A1 | 11/2012 | Amon et al. | |
| 2013/0003871 A1 | 1/2013 | Bjontegaard et al. | |
| 2013/0051455 A1 | 2/2013 | Sze et al. | |
| 2013/0094569 A1* | 4/2013 | Chong | H04N 19/82 375/240.02 |
| 2014/0105308 A1 | 4/2014 | Matsuo et al. | |
| 2014/0286392 A1 | 9/2014 | Lim et al. | |
| 2015/0365703 A1 | 12/2015 | Puri et al. | |
| 2017/0237981 A1 | 8/2017 | Karczewicz et al. | |

FOREIGN PATENT DOCUMENTS

| | | |
|---|---|---|
| CN | 103283230 A | 9/2013 |
| EP | 1841230 A1 | 10/2007 |
| WO | 2013155084 A1 | 10/2013 |

OTHER PUBLICATIONS

Mahmood "Optimized and Iterative Wiener Filter for Image Restoration," Proceeding of the 6th International Symposium on Mechatronics and its applications (ISMA09), Sharjah, UAE, XP031490345, pp. 1-6, Institute of Electrical and Electronics Engineers, New York, New York (Mar. 23-26, 2009).

"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, pp. 1-812, International Telecommunication Union, Geneva, Switzerland (Apr. 2017).

"Series H: Audiovisual and Multimedia Systems, Infrastructure of audiovisual services—Coding of moving video, High efficiency video coding," Recommendation of ITU-T H.265, ITU-T Telecommunication Standardization Sector of ITU, H.265, pp. 1-664, International Telecommunication Union, Geneva, Switzerland (Dec. 2016).

"Information technology—High efficiency coding and media delivery in heterogeneous environments—Part 2: High efficiency video coding," ISO/IEC 23008-2, Total 13 pages (Dec. 2013).

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

Chen et al., "Classified Quadtree-based Adaptive Loop Filter," 2011 IEEE International Conference on Multimedia and Expo, Total 6 pages, Institute of Electrical and Electronics Engineers, New York, New York (Jul. 2011).

"Coding tools investigation for next generation video coding," ITU Telecommunication Standardization Sector, COM 16-C 806-E, pp. 1-7, International Telecommunication Union, Geneva, Switzerland (Jan. 2015).

* cited by examiner

IN-LOOP FILTER APPARATUS AND METHOD FOR VIDEO CODING

CROSS-REFERENCE TO RELATED APPLICATIONS

This application is a continuation of International Application No. PCT/RU2017/000849, filed on Nov. 13, 2017, the disclosure of which is hereby incorporated by reference in its entirety.

TECHNICAL FIELD

Generally, the present disclosure relates to the field of video coding. More specifically, the present disclosure relates to an in-loop filter apparatus and method for filtering reconstructed video frames as well as an encoding apparatus and a decoding apparatus comprising such an in-loop filter apparatus.

BACKGROUND

Digital video communication and storage applications are implemented by a wide range of digital devices, e.g., digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source frame or picture into frame or picture blocks. Processing of these blocks depend on their size, spatial position and a coding mode specified by an encoder. Coding modes can be classified into two groups according to the type of prediction: intra- and inter-prediction modes. Intra-prediction modes use pixels of the same frame (also referred to as picture or image) to generate reference samples to calculate the prediction values for the pixels of the block being reconstructed. Intra-prediction is also referred to as spatial prediction. Inter-prediction modes are designed for temporal prediction and uses reference samples of previous or next frames to predict pixels of the block of the current frame. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source frame into frame blocks in the form of so-called coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress.

A conventional adaptive loop filter is described in Qian Chen, Yunfei Zheng, Peng Yin, Xiaoan Lu, Joel Solé, Qian Xu, Edouard Francois, and Dapeng Wu, "Classified Quadtree-based Adaptive Loop Filter", 2011 IEEE International Conference on Multimedia and Expo, Pages: 1-6. In this filter each reconstructed frame is divided into a set of small macro-blocks (super-pixels) and each macro-block is filtered by the adaptive loop filter in that each pixel of the filtered reconstructed frame is a weighted sum of several pixels in the connected area of the pixel from the reconstructed frame around the position of the generating filtered pixel. This filtering process is illustrated in FIG. 1. The pixels x[0], x[1], x[2], x[3], x[4] from the reconstructed frame create a connected area of pixels which is used for filtering pixel x[2] from this frame. The filtered pixel $y_{flt}$ is a weighted sum of the pixels x[0], x[1], . . . , x[4] and it is placed at the position of pixel x[2] in the filtered reconstructed frame. The weighting coefficients (also referred to as filter coefficients) w[0], w[1], w[2] have property of central symmetry and are transmitted from the encoder to the decoder side. These weighting coefficients are estimated on the encoder side based on the minimization of a squared error measure between the original and the filtered pixels. It can be shown that estimating the weighting coefficients in such a way increases the weighting coefficients for spatial pixel positions along edges in the reconstructed frame (ALF is an edge directed filter) and so it allows effectively suppressing quantization noise. Edges often have a big size and therefore the number of transmitted weighting coefficients can become too large for an efficient processing. A large number of weighting coefficients requires a complex rate-distortion optimization (RDO) at the encoder side for decreasing the number of weighting coefficients for transmission. On the decoder side ALF requires implementation of universal multipliers and these multipliers should be reloaded for each 2×2 pixel block.

Thus, there is a need for an improved in-loop filter apparatus and method allowing to improve the prediction quality with low complexity and, thus, increase the video coding efficiency.

SUMMARY

It is an object of the disclosure to provide an improved in-loop filter apparatus and method allowing to improve the prediction quality with limited complexity and, thus, increase the video coding efficiency.

The foregoing and other objects are achieved by the subject matter of the independent claims. Further implementation forms are apparent from the dependent claims, the description and the figures.

According to a first aspect the disclosure relates to an in-loop filter apparatus for video coding, wherein the in-loop filter apparatus is configured for processing a reconstructed frame corresponding to a current frame for generation of a filtered reconstructed frame, wherein the reconstructed frame comprises a plurality of pixels, each pixel being associated with a pixel or sample value. The in-loop filter apparatus comprises a processing unit configured to: partition the reconstructed frame into a plurality of overlapping and/or non-overlapping 2D pixels blocks (i.e. 2D blocks of pixels); generate for each 2D pixels block a 2D spectrum by applying a 2D transform to the 2D pixels block, wherein the 2D spectrum comprises a plurality of spectral components; generate for each 2D pixels block a filtered 2D spectrum by multiplying each spectral component with a respective gain coefficient, wherein the respective gain coefficient depends on the respective spectral component and/or one or more neighboring spectral components of the respective spectral component and one or more filtering parameters; generate for each 2D pixels block a filtered 2D pixel block by applying an inverse 2D transform to the filtered 2D spectrum; and generate the filtered reconstructed frame on the basis of the plurality of filtered 2D pixels blocks.

Thus, an improved in-loop filter apparatus is provided allowing improving the efficiency for video coding. More specifically, the improved in-loop filter apparatus according to embodiments of the disclosure obtains information about edges from the reconstructed frame itself and, therefore, requires significantly less signaling than conventional filters, which signal weight coefficients for filtering in the image domain. Moreover, because of the small number of filtering parameters to be transmitted embodiments of the disclosure can be implemented using a much simpler rate distortion optimization than conventional filters. Moreover, the filtering performed by embodiments of the disclosure can be non-linear, because the gain coefficient for each spectral component depends on the spectral component itself, so that an additional coding gain can be achieved from non-linear processing. Moreover, in embodiments of the disclosure the filtering can be implemented as a lookup table. Therefore embodiments of the disclosure can be implemented without any multiplication (the 2D transform uses multiplications by constant values and therefore can be implemented only based on adding and shift operations). Finally, embodiments of the disclosure can use the DCT and the inverse DCT for the filtering process, which are already present in hybrid video codecs.

In a further possible implementation form of the first aspect, the processing unit is configured to generate for each 2D pixels block a filtered 2D spectrum on the basis of the respective gain coefficient, wherein the gain coefficient $G_{ij}$=Func (R, Prm) is a function of R and Prm, wherein (i,j) denotes 2D index of spectrum component in the 2D spectrum, R denotes the 2D spectrum of the 2D pixels block from the reconstructed frame and Prm denotes the one or more filtering parameters.

In a further possible implementation form of the first aspect, the processing unit is configured to generate for each 2D pixels block a filtered 2D spectrum on the basis of the respective gain coefficient defined by the following equation:

$$G_{ij} = \frac{R_{ij}^2}{R_{ij}^2 + \sigma^2}$$

wherein $G_{ij}$ denotes the respective gain coefficient, $R_{ij}$ denotes the spectral components of the 2D spectrum, σ denotes the one or more filtering parameters and (i,j) denotes 2D index of spectrum component in 2D spectrum.

In a further possible implementation form of the first aspect, the processing unit is configured to use the same one or more filtering parameters for different 2D pixels blocks for generating the respective filtered 2D spectrum.

In a further possible implementation form of the first aspect, the processing unit is configured to use different filtering parameters for different 2D pixel blocks or different groups of 2D pixel blocks for generating the respective filtered 2D spectrum.

In a further possible implementation form of the first aspect, the processing unit is configured to partition the reconstructed frame on the basis of a quad-tree partitioning or a quad-tree and a binary-tree partitioning and different filtering parameters can be used for groups of 2D pixels blocks, which comprise 2D pixels blocks with the same size and shape.

In a further possible implementation form of the first aspect, the 2D transform is a DCT and wherein the inverse 2D transform is an inverse DCT.

According to a second aspect the disclosure relates to a corresponding in-loop filtering method for processing a reconstructed frame corresponding to a current frame for generation of a filtered reconstructed frame, wherein the reconstructed frame comprises a plurality of pixels, each pixel being associated with a pixel value. The in-loop filtering method comprises the steps of: partitioning the reconstructed frame into a plurality of overlapping and/or non-overlapping 2D pixels blocks; generating for each 2D pixel block a 2D spectrum by applying a 2D transform to the 2D pixel block, wherein the 2D spectrum comprises a plurality of spectral components; generating for each 2D pixel block a filtered 2D spectrum by multiplying each spectral component with a respective gain coefficient, wherein the respective gain coefficient depends on the respective spectral component and/or one or more neighboring spectral components of the respective spectral component and one or more filtering parameters; generating for each 2D pixels block a filtered 2D pixel block by applying an inverse 2D transform to the filtered 2D spectrum; and generating the filtered reconstructed frame on the basis of the plurality of filtered 2D pixels blocks.

The in-loop filtering method according to the second aspect of the disclosure can be performed by the in-loop filter apparatus according to the first aspect of the disclosure. Further features of the in-loop filtering method according to the second aspect of the disclosure result directly from the functionality of the in-loop filter apparatus according to the first aspect of the disclosure and its different implementation forms described above and below.

According to a third aspect the disclosure relates to an encoding apparatus for encoding a current frame from an input video stream, wherein the encoding apparatus comprises an in-loop filter apparatus according to the first aspect of the disclosure.

In a further possible implementation form of the third aspect, the encoding apparatus is configured to provide the one or more filtering parameters to a decoding apparatus, for instance, as part of an encoded bitstream.

In a further possible implementation form of the third aspect, the processing unit of the in-loop filter apparatus is further configured to generate for each 2D pixels block of the reconstructed frame a 2D spectrum of a corresponding 2D pixels block of the current (original) frame by applying a 2D transform to the corresponding 2D pixels block of the current frame and wherein the processing unit is configured to determine the one or more filtering parameters for each 2D pixels block of the reconstructed frame by minimizing an error measure between the filtered 2D spectrum of the 2D pixels block of the reconstructed frame and the 2D spectrum of the corresponding 2D pixels block of the current frame.

In a further possible implementation form of the third aspect, the error measure is the sum of the squared differences between the spectral components of the filtered 2D spectrum of the 2D pixels block of the reconstructed frame and the spectral components of the 2D spectrum of the corresponding 2D pixels block of the current (original) frame.

In a further possible implementation form of the third aspect, the processing unit is configured to determine the filtering parameter σ for each 2D pixel block or for a group of 2D pixels blocks of the reconstructed frame on the basis of an iterative procedure defined by the following equations:

$$a_k = a_{k-1} + da_k, k = 1, \ldots, N$$

$$da_k = \frac{\sum_{ij} b_{ij}^k c_{ij}^k (b_{ij}^k R_{ij} - Orig_{ij})}{\sum_{ij} (b_{ij}^k c_{ij}^k)^2},$$

$$c_{ij}^k = \frac{R_{ij}}{R_{ij} + a_{k-1}},$$

$$b_{ij}^k = c_{ij}^k R_{ij},$$

$$\sigma^2 = a_N$$

wherein $R_{ij}$ denotes the spectral components of the 2D spectrum the 2D pixels block of the reconstructed frame, $Orig_{ij}$ denotes the spectral components of the 2D spectrum the corresponding 2D pixels block of the current frame, $a_k$, $c_{ij}^k$, and $b_{ij}^k$ and denote intermediate variables, N denotes the number of iterations, k denotes the index of iteration and (i,j) denotes index of 2D spectrum component.

In a further possible implementation form of the third aspect, the encoding apparatus is configured to set and transmit an "adaptive_filtering_flag" flag for informing the decoding apparatus that a respective 2D pixels block of the reconstructed frame has been filtered.

In a further possible implementation form of the third aspect, the encoding apparatus is configured to set and transmit a "transform_size" identifier for informing the decoding apparatus about the size of the 2D pixels block.

In a further possible implementation form of the third aspect, the encoding apparatus is configured to set and transmit a "frame_level_usage_flag" flag for informing the decoding apparatus that the whole reconstructed frame has been filtered.

In a further possible implementation form of the third aspect, the encoding apparatus is configured to set and transmit a "macroblock_size" identifier for informing the decoding apparatus about the size of a pixels area which should be filtered on the decoder side.

In a further possible implementation form of the third aspect, the encoding apparatus is configured to set and transmit a "use_filtered_mb_flag" flag for informing the decoding apparatus that the current pixels area with the size "macroblock_size" should be filtered on the decoder side.

According to a fourth aspect the disclosure relates to a decoding apparatus for decoding a current reconstructed frame from a received bitstream, wherein the decoding apparatus comprises an in-loop filter apparatus according to the first aspect of the disclosure.

According to a fifth aspect the disclosure relates to a computer program comprising program code for performing the method according to the fourth aspect when executed on a computer.

BRIEF DESCRIPTION OF THE DRAWINGS

Further embodiments of the disclosure will be described with respect to the following figures, wherein.

In the various figures, identical reference signs will be used for identical or functionally equivalent features.

DETAILED DESCRIPTION OF THE EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 2:
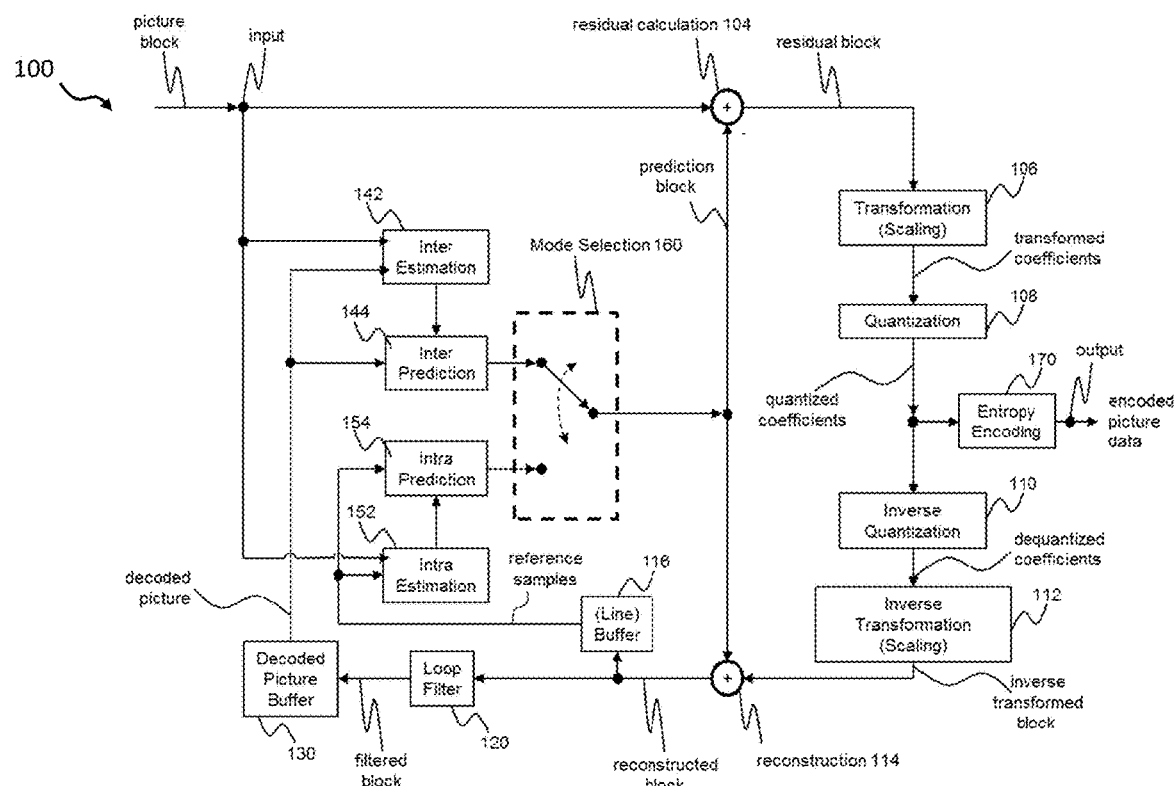
FIG. 2 shows a schematic diagram illustrating an encoding apparatus according to an embodiment comprising an in-loop filter apparatus according to an embodiment.

FIG. 2 shows an encoding apparatus 100 according to an embodiment comprising an in-loop filter apparatus 120 according to an embodiment. The encoding apparatus 100 is configured to encode a block of a frame of a video signal comprising a plurality of frames (also referred to as pictures or images herein), wherein each frame is dividable into a plurality of blocks and each block comprises a plurality of pixels. In an embodiment, the blocks could be macro blocks, coding tree units, coding units, prediction units and/or prediction blocks.

In the exemplary embodiment shown in FIG. 2, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 2 comprises an intra prediction unit 154 for intra prediction. An intra frame can be decoded without information from other frames. The intra prediction unit 154 can perform the intra prediction of a block on the basis of information provided by the intra estimation unit 152.

The blocks of subsequent frames following the first intra frame can be coded using inter or intra prediction, as selected by a mode selection unit 160. To this end, the encoding apparatus 100 shown in FIG. 2 further comprises an inter prediction unit 144. Generally, the inter prediction unit 144 can be configured to perform motion compensation of a block based on motion estimation provided by the inter estimation unit 142.

Furthermore, in the hybrid encoder embodiment shown in FIG. 2 a residual calculation unit 104 determines the difference between the original block and its prediction, i.e. the residual block defining the prediction error of the intra/inter picture prediction. This residual block is transformed by the transformation unit 106 (for instance using a DCT) and the transformation coefficients are quantized by the quantization unit 108. The output of the quantization unit 108 as well as the coding or side information provided, for instance, by the intra prediction unit 154, the inter prediction unit 144 and the in-loop filter apparatus 120 are further encoded by an entropy encoding unit 170.

A hybrid video encoder usually duplicates the decoder processing such that both will generate the same predictions. Thus, in the embodiment shown in FIG. 2 the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by the in-loop filter 120, which will be described in more detail below. The final picture is stored in the decoded picture buffer 130 and can be used for the inter prediction of subsequent frames.

Figure 1:
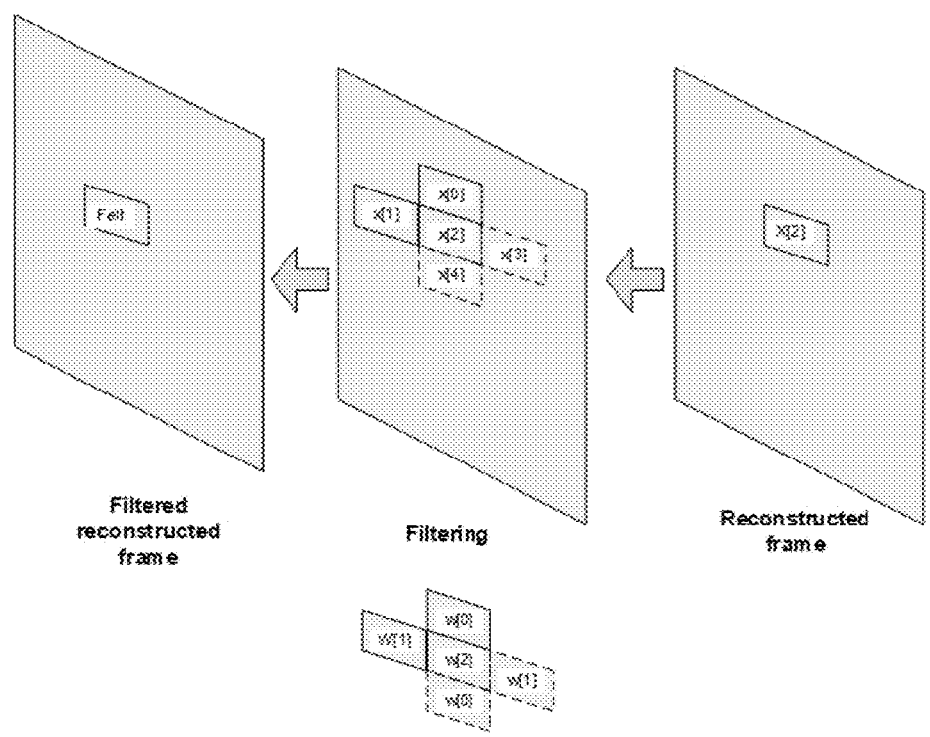
FIG. 1 shows a schematic diagram illustrating a filtering process implemented in a conventional in-loop filter apparatus for video coding.
Figure 3:
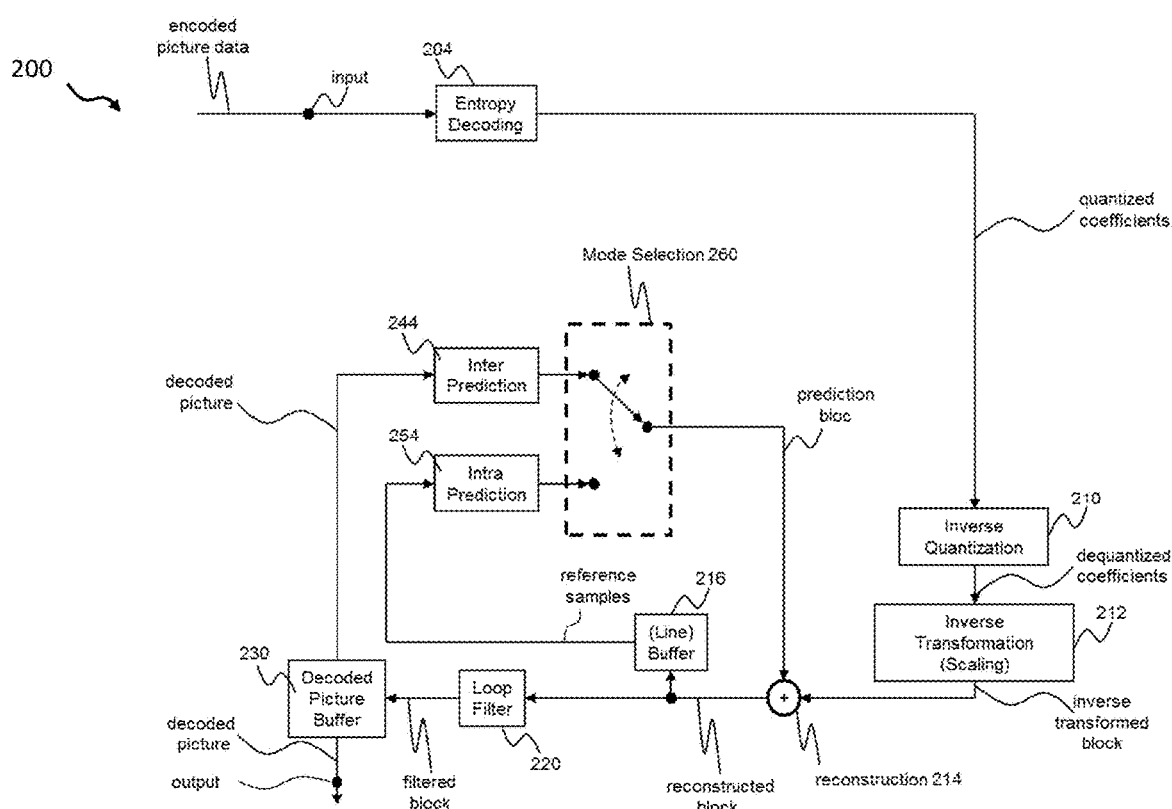
FIG. 3 shows a schematic diagram illustrating a decoding apparatus according to an embodiment comprising an in-loop filter apparatus according to an embodiment.

FIG. 3 shows a decoding apparatus 200 according to an embodiment comprising an in-loop filter apparatus 220 according to an embodiment. The decoding apparatus 200 is configured to decode a block of a frame of an encoded video signal. In the embodiment shown in FIG. 3 the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for an intra prediction unit 254 and an inter prediction unit 244 as well as other components of the decoding apparatus 200, such as the in-loop filter apparatus 220. Generally, the intra prediction unit 254 and the inter prediction unit 244 of the decoding apparatus 200 shown in FIG. 3 are selected by a mode selection unit 260 and function in the same way as the intra prediction unit 154 and the inter prediction unit 144 of the encoding apparatus 100 shown in FIG. 1, so that identical predictions can be generated by the encoding apparatus 100 and the decoding apparatus 200. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the in-loop filter apparatus 220 for inter prediction.

As already described above, the in-loop filter apparatus 120, 220 is configured to process a reconstructed frame from a decoded reconstructed video stream for generating a filtered reconstructed frame. To this end, the in-loop filter apparatus 120, 220 comprises a processing unit. As will be explained in more detail below, the processing unit is configured to: partition the reconstructed frame into a plurality of overlapping and/or non-overlapping 2D pixels blocks (i.e. 2D blocks of pixels); generate for each 2D pixels block a 2D spectrum by applying a 2D transform to the 2D pixels block, wherein the 2D spectrum comprises a plurality of spectral components; generate for each 2D pixels block a filtered 2D spectrum by multiplying each spectral component with a respective gain coefficient, wherein the respective gain coefficient depends on the respective spectral component and/or one or more neighboring spectral components of the respective spectral component and one or more filtering parameters; generate for each 2D pixels block a filtered 2D pixels block by applying an inverse 2D transform to the filtered 2D spectrum; and generate the filtered reconstructed frame on the basis of the plurality of filtered 2D pixel blocks. In an embodiment, the respective gain coefficient depends on the one or more filtering parameters and the respective spectral component gain itself. In an embodiment, the respective gain coefficient can depend on the one or more filtering parameters and the respective spectral component as well as the respective neighboring spectral components above, to the left, below and to the right of the spectral component.

Figure 4:
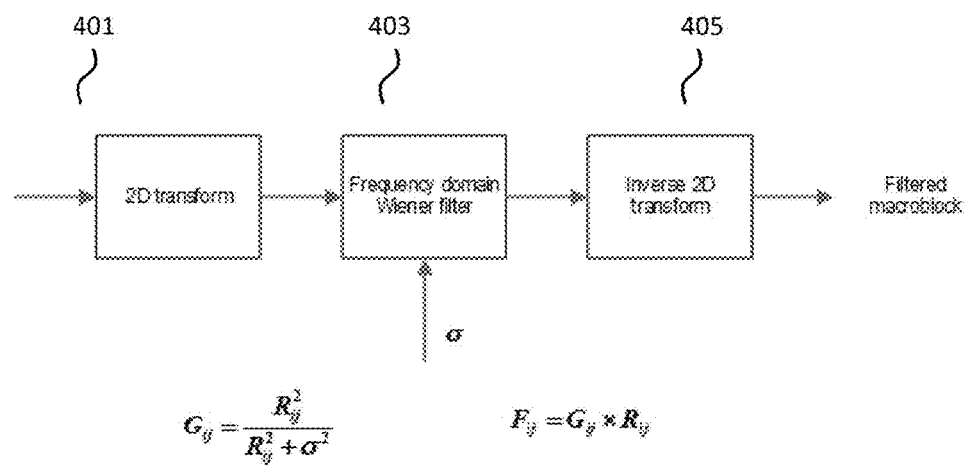
FIG. 4 shows a schematic diagram illustrating aspects of a filtering process implemented in an in-loop filter apparatus according to an embodiment.

FIG. 4 provides a general overview of the processing steps implemented in the in-loop filter apparatus 120, 220 according to an embodiment. For each block of the reconstructed frame (as provided for instance by the reconstruction unit 114, 214) a 2D transform is performed as illustrated by processing block 401 in FIG. 4. In an embodiment, the 2D transform can be 2D discrete cosine transform (DCT). In another embodiment, the 2D transform can be a 2D Hadamard transform or another Fourier-related transform providing energy compaction. The result of the 2D transform is a 2D spectrum, which is denoted herein as $R_{ij}$ and further processed in the "frequency domain". In processing block 403 of FIG. 4 the 2D spectrum $R_{ij}$ is filtered. In the embodiment shown in FIG. 4, the filtering in the frequency domain is done by multiplying each spectral component $R_{ij}$ with a gain coefficient $G_{ij}$, which depends on i and j. Thus, as illustrated in FIG. 4, the output of the processing block 403 of FIG. 4, i.e. the filtered 2D spectrum can be denoted as $F_{ij}=G_{ij}\times R_{ij}$, wherein the operator x denotes the element-wise multiplication. The gain coefficient $G_{ij}$ for all spectral components $R_{ij}$ can be considered as the frequency impulse response of the filter applied in the processing block 403.

Generally, according to embodiments of the disclosure the gain coefficient $G_{ij}$ for the current block of the reconstructed frame itself can depend on the spectral components $R_{ij}$ of the current block in connected area of spectrum components around of filtering spectrum component as well as one or more filtering parameters. This can be expressed as follows:

$$G_{ij}=\text{Func}(R, Prm)$$

$$Prm=[p_1 p_2 \ldots p_k]$$

wherein R denotes the 2D spectrum and Prm denotes the one or more filtering parameters as a vector of filtering parameters.

For example, according to embodiments of the disclosure the gain coefficient $G_{ij}$ for the current block of the reconstructed frame itself depends on the spectral components $R_{ij}$ of the current block as well as one or more filtering parameters. In the embodiment illustrated in FIG. 4, the in-loop filter apparatus 120, 220 is configured to use the gain coefficient $G_{ij}$ described by the following equation:

$$G_{ij} = \frac{R_{ij}^2}{R_{ij}^2 + \sigma^2},$$

wherein σ denotes the filtering parameter.

In the following further embodiments of the in-loop filter apparatus 120, 220, the encoding apparatus 100 and the decoding apparatus 200 will be described. In this context it will be understood that embodiments of the in-loop filter apparatus relate to embodiments of the in-loop filter apparatus 120 as implemented in the encoding apparatus 100 as well as embodiments of the in-loop filter apparatus 220 as implemented in the decoding apparatus 200.

As already mentioned above, the processing unit of the in-loop filter apparatus 120, 220 is configured to partition the reconstructed frame into a plurality of overlapping and/or non-overlapping 2D pixel blocks. These blocks can, for instance, have the shape of a square or a rectangle, but also other shapes. Moreover, the 2D pixels blocks of the reconstructed frame can have the same size or different sizes. In an embodiment, the processing unit is configured to partition the reconstructed frame on the basis of a quad-tree partitioning or a quad-tree and a binary-tree partitioning. In the case of overlapping pixel blocks the filtered reconstructed frame can be generated on the basis of the plurality of filtered 2D pixel blocks by taking averages of filtered pixel values at the same pixel position.

According to embodiments of the disclosure, optimal filtering parameters are estimated at the encoding apparatus 100 and transferred to the decoding apparatus 200.

In an embodiment, the same optimal filtering parameters can be found at the encoding apparatus 100 and transferred from the encoding apparatus 100 to the decoding apparatus for processing of all blocks of pixels of the reconstructed frame. In other words, in an embodiment the processing unit is configured to use the same one or more filtering parameters for different 2D pixels blocks for generating the respective filtered 2D spectrum.

In an embodiment, the filtering of blocks from the reconstructed frame may be separated in several groups of blocks and for each group different optimal filtering parameters can be estimated and transferred from the encoding apparatus 100 to the decoding apparatus 200. Thus, in an embodiment the processing unit is configured to use different filtering parameters for different 2D pixels blocks or different groups of 2D pixels blocks for generating the respective filtered 2D spectrum.

In an embodiment, the estimation of the optimal filtering parameters can be performed for each block of pixels from the reconstructed frame independently. In this case the optimal filtering parameters can be transferred for each block of pixels. If a quad-tree or quad-tree and binary-tree reconstructed frame partitioning is used then the estimation of the optimal filtering parameters and the transfer thereof from the encoding apparatus 100 to the decoding apparatus 200 can be performed for each macro-block with the same shape and size.

In an embodiment the processing unit of the in-loop filter apparatus 120 of the encoding apparatus 100 is further configured to generate for each 2D pixels block of the reconstructed frame a 2D spectrum of a corresponding 2D pixels block of the current (original) frame by applying the 2D transform to the corresponding 2D pixels block of the current frame. Moreover, the processing unit is configured to determine the filtering parameter σ for each 2D pixels block of the reconstructed frame by minimizing an error measure between the filtered 2D spectrum of the 2D pixels block of the reconstructed frame and the 2D spectrum of the corresponding 2D pixels block of the current (original) frame. As will be appreciated, in this case the same block partitioning should be used for the current, i.e. original frame and the reconstructed frame.

Figure 5:
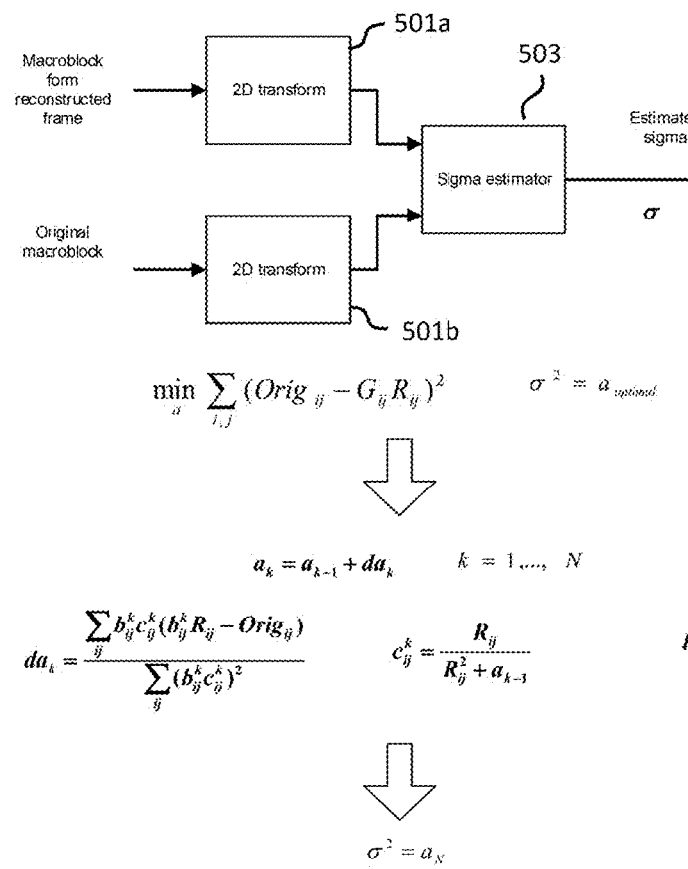
FIG. 5 shows a schematic diagram illustrating a further aspect of a filtering process implemented in an in-loop filter apparatus according to an embodiment.

In an embodiment, the error measure is the sum of the squared differences between the spectral components of the filtered 2D spectrum of the 2D pixels block of the reconstructed frame and the spectral components of the 2D spectrum of the corresponding 2D pixels block of the current frame, as further illustrated in FIG. 5.

FIG. 5 illustrates the estimation of the filtering parameter σ implemented in embodiments of the disclosure. According to an embodiment, at the first step of processing the same partitioning is used for the current original frame and the reconstructed frame for getting collocated block of pixels from the reconstructed and the original frame. Then for each pair of pixel blocks, wherein the first block comprises pixels from the reconstructed frame and the second block comprises pixels from the current original frame, 2D transforms are performed and the respective 2D spectrum of the block of pixels from the current original frame and the collocated block of pixels from the reconstructed frame are estimated (see processing blocks 501a and 501b of FIG. 5). In a next step, groups of several blocks of pixels from the reconstructed frame are created and optimal filtering parameters are estimated for these groups. For estimation of the optimal filtering parameters the reconstructed blocks of pixels from the groups and the collocated blocks of pixels from the original frame can be used. Filtering parameters estimation is performed by the sigma estimator block 503 shown in FIG. 5. The estimator of the filtering parameters determine the optimal filtering parameters which minimize the average square error between the spectral components of the original blocks and corresponding spectral components of the filtered reconstructed blocks, wherein the blocks of pixels from the reconstructed frame and the collocated blocks of pixels from the original frames belong to the same group.

In the embodiment shown in FIG. 5, the processing unit is configured to perform the minimization over the filtering parameters Prm on the basis of the following equation:

$$\min_{Prm} \sum_{i,j,m} (Orig_{ij}^m - G_{ij} R_{ij}^m)^2$$

wherein m denotes an index of a block of pixels inside a group, $G_{ij}$ denotes the gain coefficient, $R_{ij}^m$ denotes the spectral components of the m-th 2D pixels block of a group of pixel blocks of the reconstructed frame, $Orig_{ij}^m$ denotes original macro-block spectral components of the m-th block of pixels and (i,j) denote 2D index of spectrum component in 2D spectrum.

In an embodiment, the processing unit is configured to determine the filtering parameter σ for each 2D pixels block of the reconstructed frame on the basis of an iterative procedure defined by the following equations (as illustrated in FIG. 5):

$$a_k = a_{k-1} + da_k, k = 1, \ldots, N$$

$$da_k = \frac{\sum_{ij} b_{ij}^k c_{ij}^k (b_{ij}^k R_{ij} - Orig_{ij})}{\sum_{ij} (b_{ij}^k c_{ij}^k)^2},$$

$$c_{ij}^k = \frac{R_{ij}}{R_{ij} + a_{k-1}},$$

$$b_{ij}^k = c_{ij}^k R_{ij},$$

$$\sigma^2 = a_N$$

wherein $R_{ij}$ denotes the spectral components of the 2D spectrum the 2D pixel block of the reconstructed frame, $Orig_{ij}$ denotes the spectral components of the 2D spectrum the corresponding 2D pixels block of the current frame, $a_k$, $c_{ij}^k$, and $b_{ij}^k$ denote intermediate variables, N denotes the number of iterations, k denotes the index of iteration and (i,j_denote 2D index of spectrum component in 2D spectrum. The iteration can be stopped, for instance, once $da_k$ is smaller than a predetermined threshold.

On the last stage of processing at the encoding apparatus 100 a rate-distortion-optimization process can be performed for determining which blocks of the reconstructed frame should be filtered and which blocks of reconstructed frame should not be changed. A corresponding embodiment is shown in FIG. 6.

Figure 6:
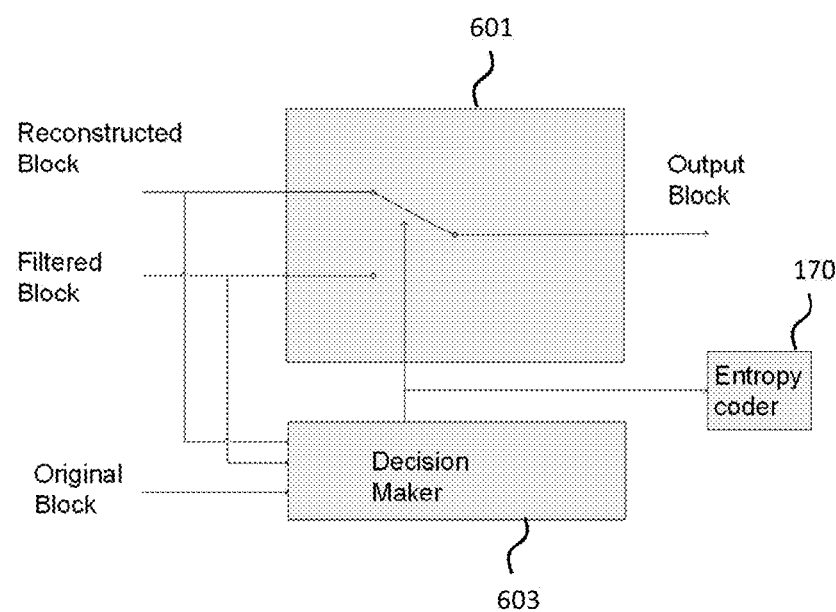
FIG. 6 shows a schematic diagram illustrating a further aspect of a filtering process implemented in an in-loop filter apparatus according to an embodiment.

FIG. 6 shows a block diagram which illustrates the operation of an application map unit implemented in the encoding apparatus 100 according to an embodiment. The application map unit determines where the reconstructed image should be filtered and where the original reconstructed frame should be used for prediction and delivery for an end user. A block generation unit (not shown) generates a set of macro-blocks which covers the reconstructed frame. Then, for each macro-block the decision maker block 603 makes a decision about filter usage for the chosen macro-block during a rate distortion optimization (RDO) process. Correspondingly, a switch 601 chooses an output block to be either the reconstructed block or the filtered block. If a coding gain from removing quantization noise from the decoded image is significantly more than degradation of the filtered decoded image, then filtering is applied. Otherwise, a reconstructed image is used as output for an end user and prediction. The application map block decisions can be encoded using the entropy encoder 170 and transferred from the encoding apparatus 100 to the decoding apparatus 200.

In an embodiment, the following information can be transferred from the encoding apparatus 100 to the decoding apparatus 200: the one or more filtering parameters for each block of the reconstructed frame or for the whole reconstructed frame or for each group of blocks of the reconstructed frame; the transform size for each group of blocks; an adaptive_filtering_flag flag using for event signaling when the proposed compression tool should be used; a frame_level_usage_flag flag used for signaling when the whole reconstructed frame should be filtered; a macroblock-_size identifier which determines block size which should be used for filtering; and/or a use_filtered_mb_flag flag which shows whether the filtered block should be used.

Figure 7:
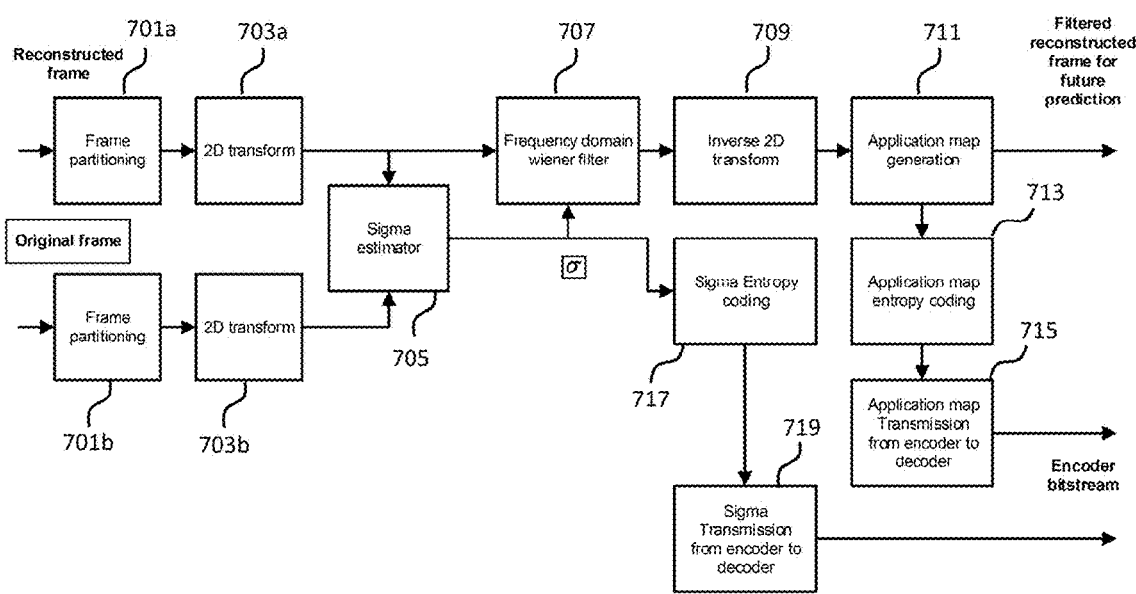
FIG. 7 shows a schematic diagram illustrating processing steps implemented in an encoding apparatus according to an embodiment comprising an in-loop filter apparatus according to an embodiment.

FIG. 7 shows a flow chart illustrating the process implemented in the encoding apparatus 100 according to an embodiment. On the first stage of processing the reconstructed frame is generated based on prediction and transformed and quantized residual signal. On the next step 701a a set of overlapping or non-overlapping blocks covering the reconstructed frame is generated. The same partitioning is used for the original frame (step 701b). Then for each pair of collocated blocks of pixels from the reconstructed and the original frame the 2D transform is performed for estimation of the respective 2D spectrum of the reconstructed block and the collocated original block (steps 703a, 703b). Different pairs of reconstructed and original blocks can be merged in groups of blocks of pixels and for each group of blocks in a step 705 optimal filtering parameter(s) can be calculated, which minimize(s) the average square error between the spectral components of the reconstructed blocks and the original blocks, wherein the reconstructed blocks and the original blocks are the members of the same group. The estimated filtering parameters are encoded on the encoder side and placed to video codec output bitstream for transferring from encoder to decoder side (see steps 717 and 719 of FIG. 7). In a step 707 filtering of each reconstructed block in the frequency domain is performed based on a multiplication of the spectral components of the reconstructed block with the filter frequency impulse response, i.e. the gain coefficients. Each component of the frequency impulse response, i.e. each gain coefficient is calculated based on corresponding reconstructed block spectral components and the filtering parameters estimated in step 705. The filtered 2D spectra of the reconstructed blocks are transformed back to the image or pixel domain by the inverse 2D transform in step 709 and then the filtered reconstructed blocks are used for detection parts of reconstructed frame wherein filtering should be performed. Thus, in step 711 an independent partitioning (in respect to the initial reference frame partitioning) of the filtered reconstructed frame is created and it is decided which block from this partitioning should be filtered and which block should not be filtered. The corresponding application map is encoded in step 713 and placed to the output bitstream for transferring from the encoding apparatus 100 to the decoding apparatus 200 (step 715). The filtered reconstructed frame can be placed to the decoded picture buffer 130 of the encoding apparatus 100 for future prediction.

Figure 8:
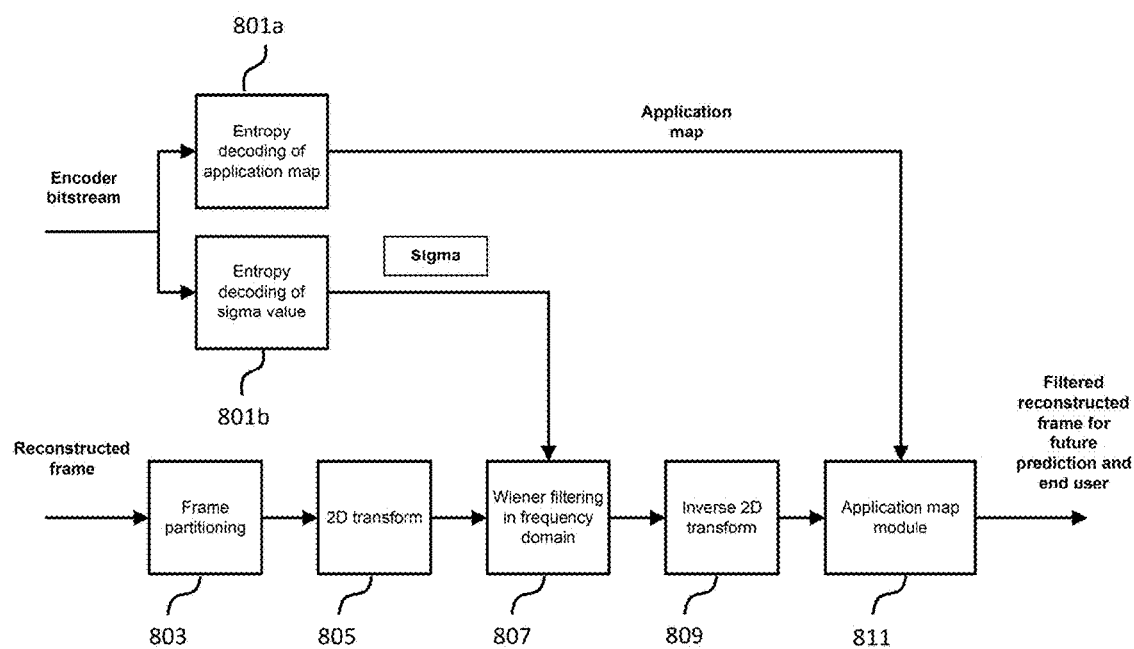
FIG. 8 shows a schematic diagram illustrating processing steps implemented in a decoding apparatus according to an embodiment comprising an in-loop filter apparatus according to an embodiment.

FIG. 8 shows a flow chart illustrating the corresponding process implemented in the decoding apparatus 200 according to an embodiment. On the first stage of processing the decoding apparatus extracts the proposed filtering parameters and the application map from the received bitstream (steps 801a and 801b) and generates the reconstructed frame based on the prediction signal and the residual signal extracted from received bitstream. Then, the decoding apparatus 200 performs the same operation as the encoding apparatus 100. In other words, the decoding apparatus 200 generates the set of overlapping and/or non-overlapping pixel blocks covering the reconstructed frame (step 803) and performs filtering of these blocks of the reconstructed frame in steps 805, 807 and 809 in the same manner as the encoding apparatus in steps 703a, 707 and 709 of FIG. 7, with the only difference that the filtering parameter(s) and the application map are not estimated by the decoding apparatus 200 but extracted from encoded bitstream. The filtered reconstructed frame can be placed to the decoded picture buffer 230 of the decoding apparatus 200 for future prediction and can be sent to the end user.

Figure 9:
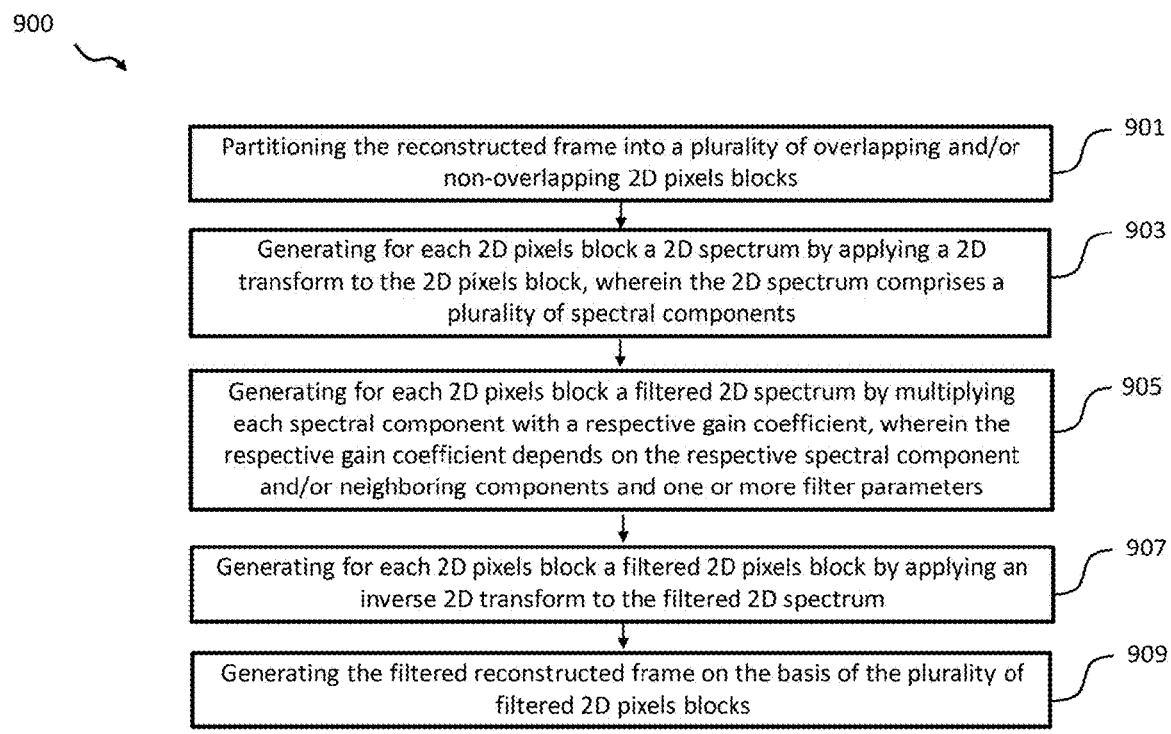
FIG. 9 shows a flow diagram illustrating steps of an in-loop filtering method according to an embodiment.

FIG. 9 shows a flow diagram illustrating steps of a corresponding in-loop filtering method 900 according to an embodiment. The method 900 comprises the following steps: partitioning 901 the reconstructed frame into a plurality of overlapping and/or non-overlapping 2D pixels blocks; generating 903 for each 2D pixels block a 2D spectrum by applying a 2D transform to the 2D pixels block, wherein the 2D spectrum comprises a plurality of spectral components; generating 905 for each 2D pixels block a filtered 2D spectrum by multiplying each spectral component with a respective gain coefficient, wherein the respective gain coefficient depends on the respective spectral component and/or one or more neighboring spectral components of the respective spectral component and one or more filtering parameters; generating 907 for each 2D pixel block a filtered 2D pixel block by applying an inverse 2D transform to the filtered 2D spectrum; and generating 909 the filtered reconstructed frame on the basis of the plurality of filtered 2D pixel blocks.

The processing unit may be any kind of programmable or non-programmable circuitry that is configured to carry out the operations described above. The processing unit may comprise hardware as well as software. For example, the processing unit may comprise one or more processors and a transitory or non-transitory memory that carries a program which causes the processing unit to perform the respective operations when the program is executed by the one or more processors.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the embodiments beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the embodiments may be practiced otherwise than as specifically described herein.

The invention claimed is:

1. An in-loop filter apparatus for video coding, wherein the in-loop filter apparatus is configured for processing a reconstructed frame corresponding to a current frame for generation of a filtered reconstructed frame, wherein the reconstructed frame comprises a plurality of pixels, each pixel being associated with a pixel value, wherein the in-loop filter apparatus comprises a processor configured to:
    partition the reconstructed frame into a plurality of overlapping and/or non-overlapping two-dimensional (2D) pixel blocks;
    generate for each 2D pixel block a 2D spectrum by applying a 2D transform to the 2D pixel block, wherein the 2D spectrum comprises a plurality of spectral components;
    generate for each 2D pixel block a filtered 2D spectrum by multiplying each spectral component with a respective gain coefficient, wherein the respective gain coefficient depends on a) the respective spectral component and one or more filtering parameters or b) the respective spectral component, one or more neighboring spectral components of the respective spectral component and the one or more filtering parameters, wherein gain coefficient $G_{i,j}$=Func (R, Prm) is a function of R and Prm, wherein (i,j) denotes a 2D index of a spectrum component in a 2D spectrum, R denotes the 2D spectrum of the 2D pixel block from the reconstructed frame and Prm denotes the one or more filtering parameters;
    generate for each 2D pixel block a filtered 2D pixel block by applying an inverse 2D transform to the filtered 2D spectrum; and
    generate the filtered reconstructed frame on the basis of the filtered 2D pixel blocks.

2. The in-loop filter apparatus of claim 1, wherein only one of the one or more filtering parameters is used for frequency domain gain coefficient estimation for each 2D pixel block from the reconstructed frame.

3. The in-loop filter apparatus of claim 1, wherein the processor is configured to generate for each 2D pixel block a filtered 2D spectrum on the basis of the respective gain coefficient defined by the following equation:

$$G_{ij} = \frac{R_{ij}^2}{R_{ij}^2 + \sigma^2}$$

wherein $G_{ij}$ denotes the respective gain coefficient, $R_{ij}$ denotes the spectral components of the 2D spectrum, $\sigma$ denotes the one or more filtering parameters and (i,j) denote 2D indices of spectrum components in the 2D spectrum.

4. The in-loop filter apparatus of claim 1, wherein the processor is configured to use a same one or more filtering parameters for different 2D pixel blocks for generating the respective filtered 2D spectrum.

5. The in-loop filter apparatus of claim 1, wherein the processor is configured to use different filtering parameters for different 2D pixel blocks or different groups of 2D pixel blocks for generating the respective filtered 2D spectrum.

6. The in-loop filter apparatus of claim 1, wherein the processor is configured to partition the reconstructed frame on the basis of a quad-tree partitioning or a quad-tree and a binary-tree partitioning and different filtering parameters are used for groups of 2D pixel blocks, which comprise 2D pixel blocks with a same size and shape.

7. The in-loop filter apparatus of claim 1, wherein the 2D transform is a discrete cosine transform (DCT) and wherein the inverse 2D transform is an inverse DCT.

8. An encoding apparatus for encoding a current frame from an input video stream, wherein the encoding apparatus comprises an in-loop filter apparatus according to claim 1.

9. The encoding apparatus of claim 8, wherein the encoding apparatus is configured to provide the one or more filtering parameters to a decoding apparatus.

10. The encoding apparatus of claim 8, wherein the processor of the in-loop filter apparatus is further configured to generate for each 2D pixel block of the reconstructed frame a 2D spectrum of a corresponding 2D pixel block of the current frame by applying a 2D transform to the corresponding 2D pixel block of the current frame and wherein the processing unit is configured to determine the one or more filtering parameters for each 2D pixel block of the reconstructed frame by minimizing an error measure between the filtered 2D spectrum of the 2D pixel block of the reconstructed frame and the 2D spectrum of the corresponding 2D pixel block of the current frame.

11. The encoding apparatus of claim 10, wherein the error measure is a sum of the squared differences between the spectral components of the filtered 2D spectrum of the 2D pixel block of the reconstructed frame and the spectral components of the 2D spectrum of the corresponding 2D pixel block of the current frame.

12. The encoding apparatus of claim 11, wherein the processor is configured to determine the filtering parameter a for each 2D pixel block or for a group of 2D pixel blocks of the reconstructed frame on the basis of an iterative procedure defined by the following equations:

$$a_k = a_{k-1} + da_k, k = 1, \ldots, N$$

$$da_k = \frac{\sum_{ij} b_{ij}^k c_{ij}^k (b_{ij}^k R_{ij} - Orig_{ij})}{\sum_{ij} (b_{ij}^k c_{ij}^k)^2},$$

$$c_{ij}^k = \frac{R_{ij}}{R_{ij} + a_{k-1}},$$

$$b_{ij}^k = c_{ij}^k R_{ij},$$

$$\sigma^2 = a_N$$

wherein $R_{ij}$ denotes the spectral components of the 2D spectrum of the 2D pixel block of the reconstructed frame, $Orig_{ij}$ denotes the spectral components of the 2D spectrum of the corresponding 2D pixel block of the current frame, $a_k$, $c_{ij}^k$, and $b_{ij}^k$ denote intermediate variables, N denotes the number of iterations, k denotes the index of iteration and (i,j) denotes indices of the 2D spectrum component.

13. The encoding apparatus of claim 8, wherein the encoding apparatus is configured to set and transmit an adaptive filtering flag for informing the decoding apparatus that a respective 2D pixel block of the reconstructed frame has been filtered.

14. The encoding apparatus of claim 9, wherein the encoding apparatus is configured to set and transmit a transform size identifier for informing the decoding apparatus about a size of the 2D pixel block.

15. The encoding apparatus of claim 9, wherein the encoding apparatus is configured to set and transmit a frame level usage flag for informing the decoding apparatus that the whole reconstructed frame has been filtered.

16. The encoding apparatus of claim 9, wherein the encoding apparatus is configured to set and transmit a macroblock size identifier for informing the decoding apparatus about the size of a pixel area which should be filtered by the decoding apparatus.

17. The encoding apparatus of claim 16, wherein the encoding apparatus is configured to set and transmit a flag for informing the decoding apparatus that the pixel area with the macroblock size should be filtered by the decoding apparatus.

18. A decoding apparatus for decoding a current reconstructed frame from a received bitstream, wherein the decoding apparatus comprises an in-loop filter apparatus according to claim 1.

19. An in-loop filtering method for processing a reconstructed frame corresponding to a current frame for generation of a filtered reconstructed frame, wherein the reconstructed frame comprises a plurality of pixels, each pixel being associated with a pixel value, wherein the in-loop filtering method comprises:

partitioning the reconstructed frame into a plurality of overlapping and/or non-overlapping 2D pixel blocks;

generating for each 2D pixel block a 2D spectrum by applying a 2D transform to the 2D pixel block, wherein the 2D spectrum comprises a plurality of spectral components;

generating for each 2D pixel block a filtered 2D spectrum by multiplying each spectral component with a respective gain coefficient, wherein the respective gain coefficient depends on a) the respective spectral component and one or more filtering parameters or b) one or more neighboring spectral components of the respective spectral component and the one or more filtering parameters, wherein gain coefficient $GI_{i,j}$=Func (R, Prm) is a function of R and Prm, wherein (i,j) denotes a 2D index of a spectrum component in the 2D spectrum, R denotes the 2D spectrum of the 2D pixel block from the reconstructed frame and Prm denotes the one or more filtering parameters;

generating for each 2D pixel block a filtered 2D pixel block by applying an inverse 2D transform to the filtered 2D spectrum; and generating the filtered reconstructed frame on the basis of the filtered 2D pixel blocks.

20. A non-transitory computer program product comprising program code for performing the method of claim 19 when executed on a computer or a processor.

\* \* \* \* \*